(12) United States Patent
Wang et al.

(10) Patent No.: US 10,606,144 B2
(45) Date of Patent: Mar. 31, 2020

(54) DISPLAY APPARATUS

(71) Applicants: BOE Technology Group Co., Ltd., Beijing (CN); Beijing BOE Optoelectronics Technology Co., Ltd., Beijing (CN)

(72) Inventors: Qian Wang, Beijing (CN); Xiaochuan Chen, Beijing (CN); Wenqing Zhao, Beijing (CN); Rui Xu, Beijing (CN); Lei Wang, Beijing (CN); Ming Yang, Beijing (CN); Pengcheng Lu, Beijing (CN); Jian Gao, Beijing (CN); Xiaochen Niu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 83 days.

(21) Appl. No.: 15/537,568

(22) PCT Filed: Nov. 10, 2016

(86) PCT No.: PCT/CN2016/105358
§ 371 (c)(1),
(2) Date: Jun. 19, 2017

(87) PCT Pub. No.: WO2017/177671
PCT Pub. Date: Oct. 19, 2017

(65) Prior Publication Data
US 2018/0196329 A1 Jul. 12, 2018

(30) Foreign Application Priority Data

Apr. 11, 2006 (CN) .......................... 2016 1 0222092

(51) Int. Cl.
*G02F 1/29* (2006.01)
*G02F 1/1335* (2006.01)
(Continued)

(52) U.S. Cl.
CPC .......... *G02F 1/29* (2013.01); *G02F 1/133602* (2013.01); *G02F 1/13306* (2013.01);
(Continued)

(58) Field of Classification Search
CPC . G02F 1/29; G02F 1/133528; G02F 2001/294
See application file for complete search history.

(56) References Cited

U.S. PATENT DOCUMENTS

| 8,681,423 | B1* | 3/2014 | Gibson | G02B 6/0035 |
| | | | | 349/196 |
| 2015/0036068 | A1* | 2/2015 | Fattal | G02B 6/0036 |
| | | | | 349/15 |
| 2017/0277012 | A1* | 9/2017 | Huh | G02B 27/225 |

FOREIGN PATENT DOCUMENTS

| CN | 103293688 A | 9/2013 |
| CN | 103562618 A | 2/2014 |

(Continued)

OTHER PUBLICATIONS

Feb. 3, 2017—(WO) International Search Report and Written Opinion Appn PCT/CN2016/105358 with English Tran.
(Continued)

*Primary Examiner* — Dung T Nguyen
(74) *Attorney, Agent, or Firm* — Banner & Witcoff, Ltd.

(57) ABSTRACT

Disclosed is a display apparatus includes: a flat display panel; and a liquid crystal lens, the liquid crystal lens being positioned in a light emergent direction of the display panel, the liquid crystal lens being used for converging light emitted by the display panel towards a center plane, and the
(Continued)

center plane being perpendicular to the display panel and passing through a vertical center line of the display panel.

20 Claims, 10 Drawing Sheets

(51) Int. Cl.
  *G02F 1/133* (2006.01)
  *G02F 1/1347* (2006.01)
(52) U.S. Cl.
  CPC .... *G02F 1/13471* (2013.01); *G02F 1/133526* (2013.01); *G02F 1/133528* (2013.01); *G02F 1/133615* (2013.01); *G02F 2001/133548* (2013.01); *G02F 2001/291* (2013.01); *G02F 2001/294* (2013.01); *G02F 2201/12* (2013.01); *G02F 2201/128* (2013.01); *G02F 2201/305* (2013.01); *G02F 2203/62* (2013.01)

(56) References Cited

FOREIGN PATENT DOCUMENTS

| | | |
|---|---|---|
| CN | 103733118 A | 4/2014 |
| CN | 104464523 A | 3/2015 |
| CN | 105044987 A | 11/2015 |
| CN | 105629622 A | 6/2016 |
| CN | 105652511 A | 6/2016 |
| CN | 105700269 A | 6/2016 |
| JP | 2015102808 A | 6/2015 |
| KR | 1020150081106 A | 7/2015 |

OTHER PUBLICATIONS

Dec. 26, 2017—(CN) First Office Action Appn 201610222092.7 with English Tran.

\* cited by examiner

US 10,606,144 B2

1

DISPLAY APPARATUS

The application is a U.S. National Phase Entry of International Application No. PCT/CN2016/105358 filed on Nov. 10, 2016, designating the United States of America and claiming priority to Chinese Patent Application No. 201610222092.7 filed on Apr. 11, 2016. The present application claims priority to and the benefit of the above-identified applications and the above-identified applications are incorporated by reference herein in their entirety.

TECHNICAL FIELD

Embodiments of the present disclosure relate to a display apparatus.

BACKGROUND

A display in a related art is mostly a flat panel display. As illustrated in FIG. 1, assuming that a viewer views a program directly in front of the flat display, a distance (L1) between the viewer and a center of a screen is unequal to a distance (L2) between the viewer and both sides of the screen, so that when the viewer views, image brightness presented on both sides of the screen are incident to human eyes along an inclined direction (i.e., a direction which is not perpendicular to the screen of the display). Generally, in this case, the viewer can receive peak brightness emitted by the center of the screen, but cannot receive peak brightness emitted by both sides of the screen and only receives relatively weak brightness emitted by both sides of the screen so as to cause a case of generating inconsistent viewing effects when the viewer views the center of the screen and both sides of the screen. Generally, for a large-sized flat display, this problem will be more obvious.

In order to solve the problem, a curved surface display emerges at the right moment. As illustrated in FIG. 2, the curved surface display has a curved surface screen obtained by physical bending. As illustrated in FIG. 3, when the viewer is at the optimal viewing position, a distance (L1) between the viewer and a center of a screen is equal to a distance (L1) between the viewer and both sides of the screen, and at the moment, whether on the center of the screen or on both sides of the screen, emitted peak brightness directly faces the viewer, so that the viewer can enjoy an equal-distance-feeling surround viewing effect.

However, the curved surface display needs to carry out physical bending on the screen, which requires a high bendability of the material and is more difficult to achieve in the process.

SUMMARY

An embodiment of the disclosure provides a display apparatus, comprising: a flat display panel; and a liquid crystal lens, the liquid crystal lens being positioned in a light emergent direction of the display panel, the liquid crystal lens being configured to converge light emitted by the display panel towards a direction of a center plane, and the center plane being perpendicular to the display panel and passing through a vertical center line of the display panel.

In one example, the liquid crystal lens includes: a first electrode and a second electrode which are arranged oppositely, wherein the first electrode includes a plurality of strip first sub-electrodes arranged in parallel, and each first sub-electrode extends along a direction of the vertical center line

2 of the display panel; and a liquid crystal layer, the liquid crystal layer being arranged between the first electrode and the second electrode.

In one example, the plurality of first sub-electrodes include a middle first sub-electrode positioned at a middle position, and widths of the first sub-electrodes on a same side of the middle first sub-electrode are gradually reduced in a direction away from the middle first sub-electrode.

In one example, the first electrode further includes: at least one second sub-electrode, the second sub-electrode extending along the direction of the vertical center line of the display panel, wherein each first sub-electrode is configured to apply a voltage with a first polarity; the second electrode is configured to apply a voltage with a second polarity, and the first polarity is opposite to the second polarity.

In one example, the at least one second sub-electrode includes a plurality of second sub-electrodes, and an orthographic projection of the at least one first sub-electrode on a panel surface of the flat display panel is positioned between orthographic projections of any two of the plurality of second sub-electrodes on the panel surface of the flat display panel.

In one example, a width of the second sub-electrode is smaller than that of the first sub-electrode adjacent to the second sub-electrode.

In one example, the second electrode is a plate electrode.

In one example, the liquid crystal lens includes: a first electrode and a second electrode which are arranged oppositely, wherein the first electrode includes a plurality of first sub-electrodes arranged in an array; a liquid crystal layer, the liquid crystal layer being arranged between the first electrode and the second electrode.

In one example, the display panel includes: a first substrate and a second substrate which are arranged oppositely and in parallel, wherein the second substrate is closer to the liquid crystal lens with respect to the first substrate; and a light correction portion, the light correction portion being borne by the first substrate or the second substrate, and the light correction portion being configured to correct incident light into emergent light perpendicular to a panel surface of the display panel.

In one example, the display panel is a passive display panel, and the display apparatus further includes: a backlight module; and the backlight module includes: a light source and a light correction portion positioned in a light emergent direction of the light source, the light correction portion being used for correcting incident light into emergent light perpendicular to a panel surface of the display panel.

In one example, the backlight module further includes: a light guide plate, the light source being positioned on a side surface of the light guide plate, the light correction portion being positioned in the light emergent direction of the light guide plate, and a surface of the light guide plate, which faces the light correction portion, has a light extraction groove; and a part of light emitted by the light source is totally reflected in the light guide plate, and another part of the light emerges from the light extraction groove and enters the light correction portion.

In one example, the light correction portion includes: a diffraction grating, the diffraction grating having a grating surface and a groove surface, the groove surface including a plurality of sub-groove surfaces, and each sub-groove surface being slantingly arranged with respect to the flat display panel, wherein the grating surface is a light incident surface, and the groove surface is a light emergent surface; and a first dielectric layer, the first dielectric layer being positioned on the groove surface of the diffraction grating, and light emerging from the diffraction grating being refracted by a light emergent surface of the first dielectric layer and becoming emergent light perpendicular to the panel surface of the display panel.

In one example, the light correction portion further includes: a second dielectric layer, the second dielectric layer being positioned on the light emergent surface of the first dielectric layer, and a light emergent surface of the second dielectric layer being in parallel to the panel surface of the display panel.

In one example, the light correction portion includes: a diffraction grating, the diffraction grating having a grating surface and a groove surface, the groove surface including a plurality of sub-groove surfaces, and the sub-groove surfaces being in parallel to the panel surface of the display panel, wherein the grating surface is a light incident surface, and the groove surface is a light emergent surface.

In one example, the diffraction grating includes a plurality of engraved groove portions, the engraved groove portions are arranged in different periods, the engraved groove portions in each period are arranged into a plurality of engraved groove groups, each engraved groove group includes a same number of engraved groove portions, the engraved groove portions in a same engraved groove group are the same in shape, and the engraved groove portions in different engraved groove groups are different in shape.

BRIEF DESCRIPTION OF THE DRAWINGS

In order to clearly illustrate the technical solution of the embodiments of the disclosure, the drawings of the embodiments or description in the prior art will be briefly described in the following. It is obvious that the described drawings are only related to some embodiments of the disclosure, and those skilled in the art also can obtain other drawings, without any inventive work, according to the drawings.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain all other embodiment(s), without any inventive work, which should be within the scope of the disclosure.

In embodiments of the present disclosure, by matching of a flat display panel (also known as a display screen) and a liquid crystal lens, for example, the liquid crystal lens can deflect light emitted by the display panel towards a viewing direction of a viewer so as to basically achieve an equal-distance-feeling surround viewing effect. A display apparatus provided by an embodiment of the present disclosure includes a display panel, and a liquid crystal lens capable of converging light emitted by the display panel towards a direction of a center plane, so that in a case that the display panel does not need to be bent, a curved surface display effect can be achieved by additionally arranging the liquid crystal lens. The display panel is flat and physically bending does not need to be carried out, and thus, problems of requirement for high bendability of a material and high difficulty to achieve a curved surface display in the process in the relate art can be solved.

Embodiment I

Figure 4A:
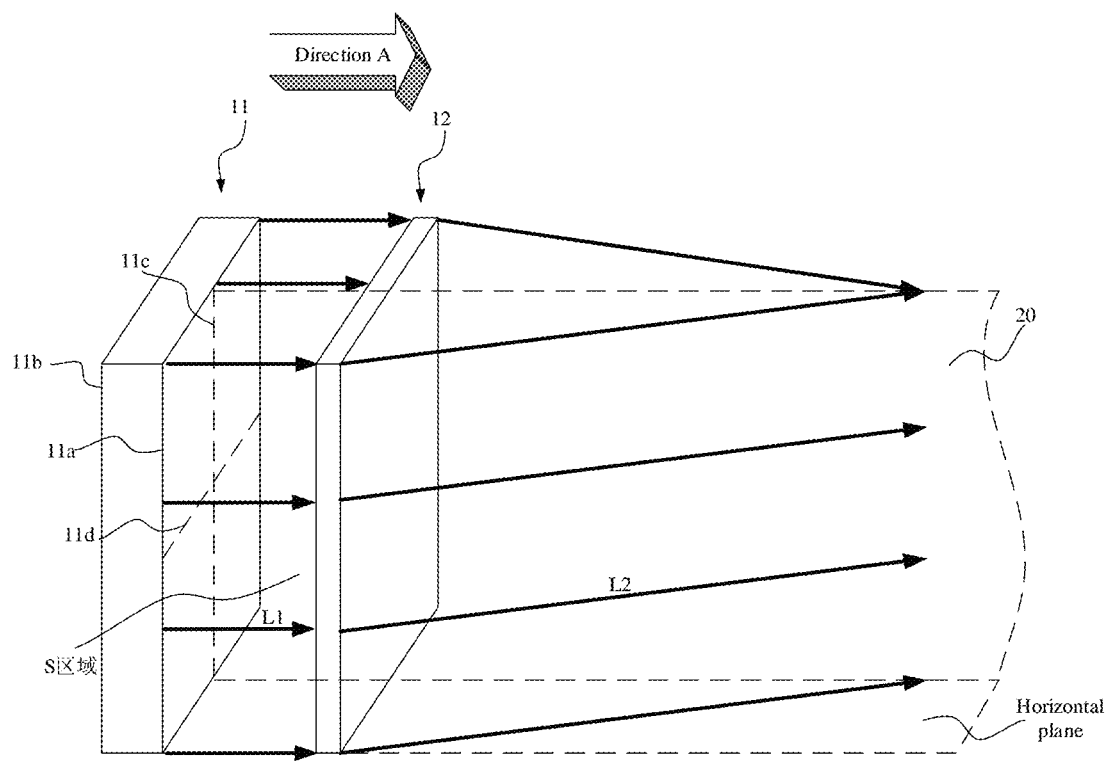
FIG. 4A is an optical path diagram of a display apparatus provided by an embodiment of the present disclosure.
Figure 4B:
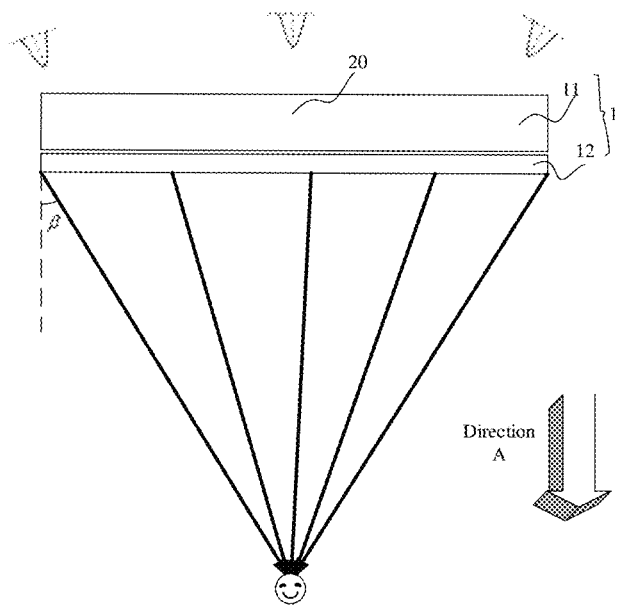
FIG. 4B is a schematic diagram of viewing the display apparatus illustrated in FIG. 4, which is provided by an embodiment of the present disclosure.

As illustrated in FIG. 4A and FIG. 4B, an embodiment of the present disclosure provides a display apparatus 1, including: a flat display panel 11 and a liquid crystal lens 12.

The reason of describing a shape of the display panel 11 as a flat surface is to distinguish the display panel 11 from a curved surface display screen, and shows that both of two surfaces (i.e., a display surface 11a and a back surface 11b opposite to the display panel) of the display panel 11 in the embodiment are flat surfaces and are nearly in parallel generally.

For example, in the embodiment, a light emergent direction of the display panel 11 is perpendicular to a panel surface of the display panel. Herein, the panel surface of the display panel 11, for example, means a light emergent surface of the display panel 11, which faces the liquid crystal lens 12. Namely, light emitted by the display panel 11 mainly emerges from the display surface 11a along a direction (a direction A in the drawings) perpendicular to the panel surface of the display panel. The reason of emphasizing "mainly" is that an error usually exists between the fact and the theory, and in the embodiment, for example, all the light emitted by the display panel 11 is perpendicular to the panel surface of the display panel, and it is required herein that most of light (e.g., red light, green light and blue light) on preset wavebands can emerge perpendicularly to the panel surface of the display panel. In the embodiment, such light is referred to as vertical light. Generally, a display panel in the related art emits light from different angles, and thus, a viewing angle (a visual angle) of the display panel generally is not zero. The vertical light herein expresses that with respect to the light emitted by the display panel in the related art, the display panel in the embodiment has a relatively small viewing angle, the viewing angle shall be as small as possible generally, and if all the light emerges perpendicularly to the panel surface of the display panel, the viewing angle is 0 degree.

It is more vividly described that assuming that a viewer is in front of the display panel, ideally the light emitted by the display panel can be incident to human eyes only when the human eyes are positioned in an S region (a three-dimensional space formed in a mode that a plane range of the display surface of the display panel extends in the direction perpendicular to the display panel), and at the moment, the viewer can see an image displayed by the display panel; and if the human eyes are positioned in a region outside the S region, the viewer cannot see the image. Compared to the display panel in the related art, which expects a relatively large viewing angle, in the embodiment, it is expected that the viewing angle of the display panel is as small as possible, and preferably, the viewing angle is 0 degree.

The display panel 11 may be an active display panel, and this display panel may be self-luminous; the display panel 11 also may be a passive display panel, and this display panel generally provides backlight by a backlight module. In following embodiments, for different types of display panels, it will be described in detail how to make the display panel emit the vertical light.

It should be noted that in the embodiment, it is also possible that the light emitted by the display panel 11 is not the vertical light; however, if the display panel 11 can emit the vertical light, the effect will be better after the vertical light is converged.

In addition, as illustrated in FIG. 4A and FIG. 4B, the liquid crystal lens 12 is positioned in the light emergent direction of the display panel 11. Exemplarily, the liquid crystal lens 12 may be closely attached to the display surface of the display panel 11, and in the drawings, in order to clearly express transmission of the light, the display panel 11 and the liquid crystal lens 12 are separately drawn. The liquid crystal lens 12 is used for converging the light emitted by the display panel 11 towards a direction of a center plane 20, and the center plane 20 is a virtual plane which is perpendicular to the display panel 11 and passes through a vertical center line 11c of the display panel. With reference to FIG. 4, the center plane is illustrated as a plane which is expressed by dotted lines, is perpendicular to the display panel 11 and passes through the vertical center line 11c of the display panel. A transverse center line 11d of the display panel is perpendicular to the vertical center line 11c so as to distinguish two center lines of the display panel. In the embodiment, the transverse center line 11d means a center line which is approximately in parallel to a connection line of both eyes of the viewer when the display panel is placed in a mode that the display panel is normally viewed, so that the vertical center line 11c is clear.

The display apparatus formed by the liquid crystal lens 12 and the display panel 11 can be used as a novel display panel, i.e., a flat display panel capable of being used for showing a curved surface display effect.

It should be noted that those skilled in the art should understand that the light emitted by the display panel 11 is converged towards the direction of the center plane 20 just for enabling light emerging from both sides of the center plane to be deflected towards the direction of the center plane 20. For example, it is undesired to change a height of the light. For example, one piece of light L1 emitted by the display panel 11 is in parallel to a horizontal plane where the display panel is placed, then the light L1 passes through the liquid crystal lens 12 to obtain light L2, the light L2 is also still in parallel to the horizontal plane, and a height from the L1 to the horizontal plane is equal to that from L2 to the horizontal plane.

For example, if all the emergent light is converged to the same position on the center plane 20, at the moment, the convergence position can be used as an optimal viewing position. For example, the embodiment does not require all the emerging light to be converged to the center plane 20, and only requires that compared with a transmission direction of the light before the light passes through the liquid crystal lens 12, the transmission direction of the light after the light passes through the liquid crystal lens 12 can be deflected towards the direction of the center plane.

It can be known from the analysis above that the liquid crystal lens 12 takes an effect of changing the transmission direction of the vertical light for example, and then there are many devices capable of taking this effect. Generally, a size of the liquid crystal lens 12 is roughly the same with that of the display panel.

Figure 1:
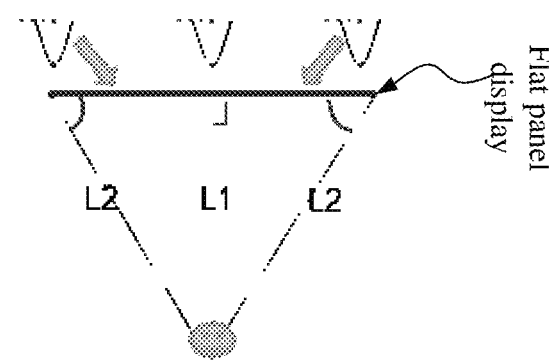
FIG. 1 is a schematic diagram of viewing a flat panel display in a related art.
Figure 2:
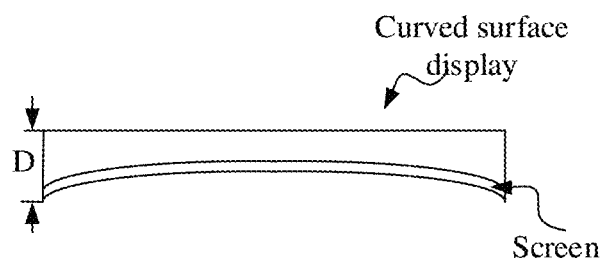
FIG. 2 is a structural schematic diagram of a curved surface panel in the related art.
Figure 3:
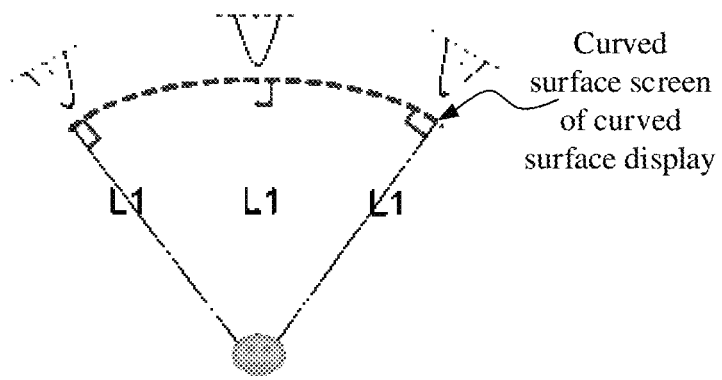
FIG. 3 is a schematic diagram of viewing a curved surface panel in the related art.

It can be seen from FIG. 2 that in the related art, a curved surface display has a curved surface screen, resulting in that a thickness of the curved surface display may be relatively large with respect to a thickness of the flat display. However, the application adopts the liquid crystal lens to achieve the effect of light deflection, and the liquid crystal lens 12 can be made into a flat shape and is relatively thin so as to benefit for reducing an integral thickness of the display apparatus in the embodiment. In addition, the liquid crystal lens further has the characteristic of variable regulation degree for the light. For example, a voltage applied to an electrode in the liquid crystal lens can be regulated as required, i.e., an electric field in the liquid crystal lens can be regulated, and thus, a convex lens to which the liquid crystal lens is equivalent is variable. Therefore, in the actual application, a corresponding voltage can be applied to the liquid crystal lens according to a position of the viewer so as to obtain the optimal viewing effect.

Figure 5A:
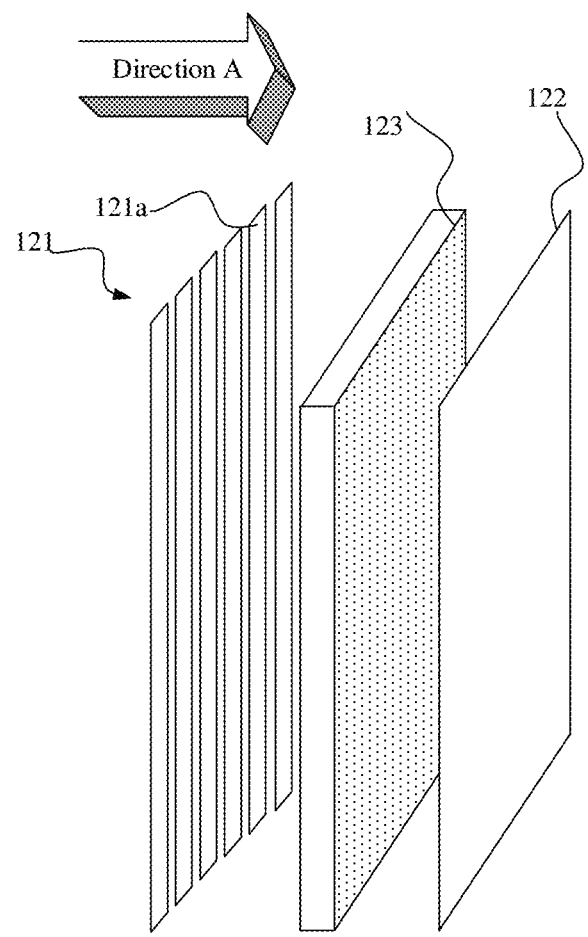
FIG. 5A is a stereoscopic structural schematic diagram of a liquid crystal lens provided by an embodiment of the present disclosure.
Figure 5B:
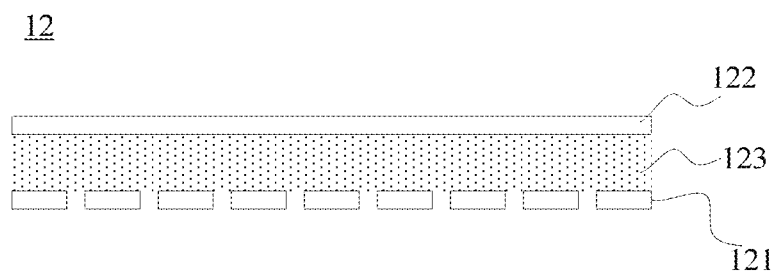
FIG. 5B is a side view of the liquid crystal lens provided by the embodiment of the present disclosure.
Figure 5C:
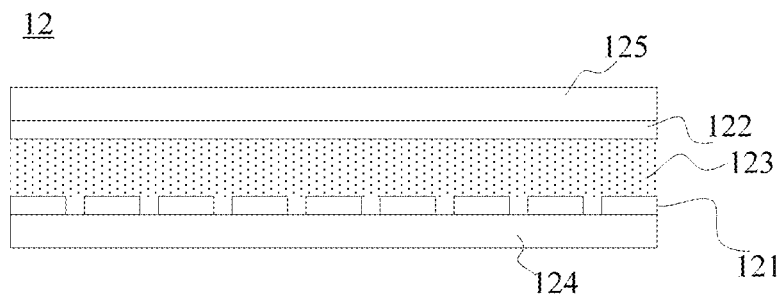
FIG. 5C is a side view of the liquid crystal lens provided by the embodiment of the present disclosure.

With reference to FIG. 5A to FIG. 5C, the liquid crystal lens includes: a first electrode 121 and a second electrode 122 which are arranged oppositely, and a liquid crystal layer 123 arranged between the first electrode 121 and the second electrode 122, wherein the first electrode 121 includes a plurality of strip first sub-electrodes 121a arranged in parallel, and each first sub-electrode 121a extends along the direction of the vertical center line 11c of the display panel. For example, a width of each first sub-electrode 121a is constant. Positions of the first electrode and the second electrode can be exchanged.

The case that the first electrode 121 and the second electrode 122 are arranged oppositely means that two electrodes have portions which directly face each other so as to form the electric field between two electrodes. Optionally, similar with the first electrode 121, the second electrode 122 may consist of a plurality of strip sub-electrodes, and these sub-electrodes correspond to the first sub-electrodes. In order to reduce a problem that in the cell-assembling process, the first electrode 121 and the second electrode 122 both of which include the strip sub-electrodes are possible to misplace to weaken strength of the electric field, in the embodiment, for example, the second electrode 122 is a plate electrode.

Generally, the electric field formed by the first electrode 121 and the second electrode 122 is gradually reinforced from middle to both sides, so that from incident light in the middle to incident light at the edge, after the incident light passes through the liquid crystal lens, as illustrated in FIG. 4B, a deflection angle (a deflection angle of light emerging from the liquid crystal lens with respect to light incident to the liquid crystal lens, which is equal to an inclination angle hereinafter) of the light is gradually increased. In FIG. 4B, for light at the outermost edge, the deflection angle of the light is β; and in FIG. 6, for light at the outermost edge, the inclination angle is α, and β is equal to α.

Those skilled in the art should understand that the liquid crystal lens includes the liquid crystal layer, and thus, an enclosed space is required, and as illustrated in FIG. 5C, this enclosed space can be obtained by carrying out cell-assembling on two base substrates 124 and 125. Certainly, the enclosed space also can be formed by one base substrate and the display panel (not illustrated in the drawings).

Embodiments of the present disclosure do not limit the type of the liquid crystal lens.

Figure 6:
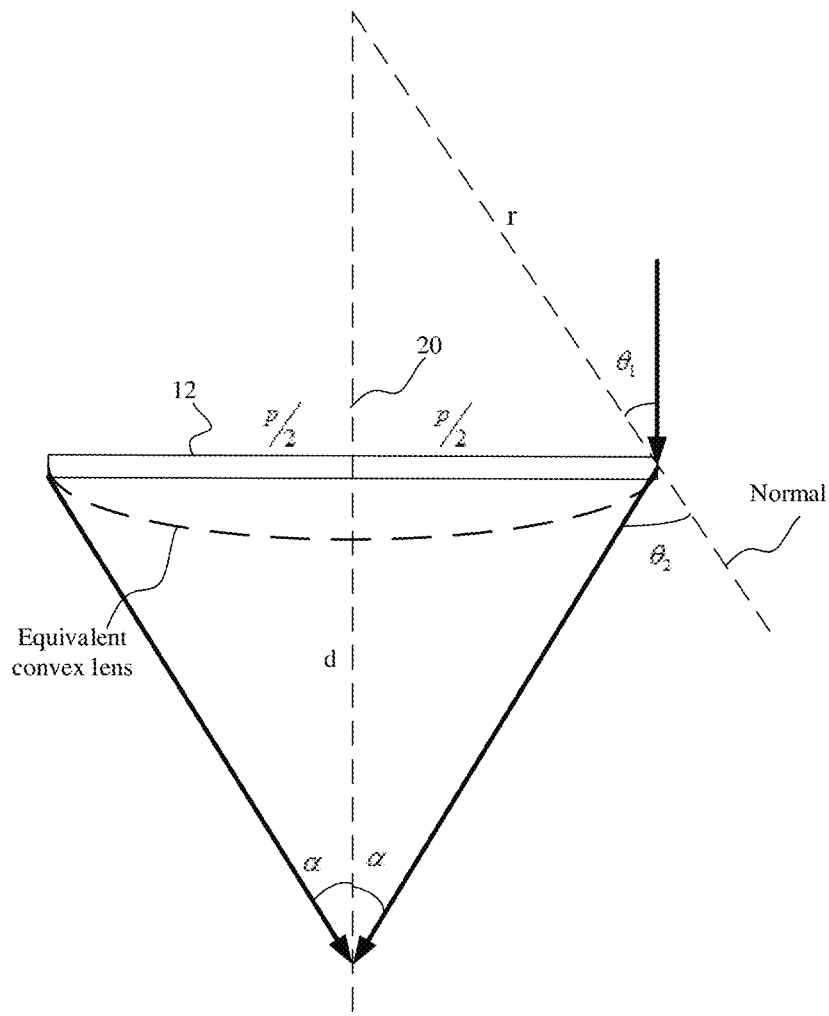
FIG. 6 is an optical path schematic diagram of an equivalent convex lens of the liquid crystal lens, which is provided by an embodiment of the present disclosure.

Firstly, with reference to FIG. 6, related parameters of the convex lens to which the liquid crystal lens is equivalent can be determined. By taking a 55-inch display panel as an example, a width of a long side of a screen is that p=1.2 m, and it is assumed that the viewer is positioned at a center position right ahead the display apparatus and a viewing distance is that d=4 m.

On this basis, an inclination angle α of light emitted by pixels at the position of the outermost edge of the screen to the viewer (the human eyes) at a center position can be calculated, and α is the maximum angle for the liquid crystal lens to deflect the incident light, thereby obtaining that tan α=p/2d=0.15.

Calculation is carried out by the incident light at the position of the outermost edge of the screen, an incident angle is denoted as $\theta_1$, and a refraction angle is denoted as $\theta_2$, so that the following calculation formula can be obtained:

$$\begin{cases} \theta_2 = \theta_1 + \alpha \\ n_1 * \sin\theta_1 = n_2 * \sin\theta_2 \\ \sin\theta_1 = p/2r \end{cases}$$

Where, $n_1$ is a medium refractive index of the convex lens to which the liquid crystal lens is equivalent, and for example, $n_1$=1.5; $n_2$ is a refractive index of air, and generally, $n_2$=1.0; and r is a curvature radius of the convex lens to which the liquid crystal lens is equivalent.

Therefore, it can be obtained by calculation that r=2.14 m.

Further, a focal length of the convex lens to which the liquid crystal lens is equivalent can be calculated, and certainly, the focal length also can be a focal length of the liquid crystal lens and is denoted as f. By adopting a focal length calculation formula $f=(r*n_1)/(n_2-n_1)$, it can be obtained that f=4,280 mm.

Then, according to a calculation formula $f=(n_2*p^2)/(8\Delta n*d)$ reflecting a corresponding relationship of the focal length and a retardation of the liquid crystal lens, it can be obtained that $\Delta n*d$=64.9 mm.

Further, corresponding liquid crystals can be selected according to actual requirements, a liquid crystal parameter $\Delta n$ of the liquid crystals can be determined, and calculation also can be carried out according to the formula to obtain a cell thickness d of the liquid crystal lens.

The calculation method above is only used for illustration, to which the embodiments of the present disclosure is not limited, to obtain related parameters of the liquid crystal lens so as to manufacture the liquid crystal lens which accord with these parameter requirements.

Figure 5D:
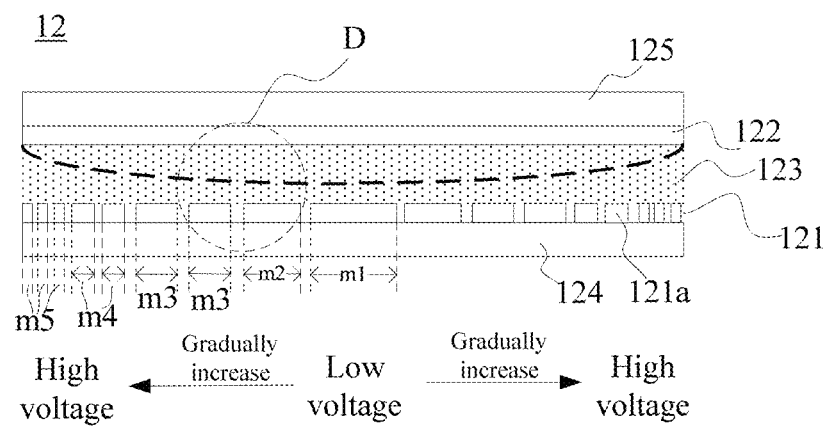
FIG. 5D is a side view of the liquid crystal lens provided by the embodiment of the present disclosure.

With respect to the first electrode 121 in the liquid crystal lens 12, further, for example, with reference to FIG. 5D, from the first sub-electrode 121a in the middle to the first sub-electrodes 121a on both sides, widths of the first sub-electrodes 121a are gradually decreased. Optionally, the electrode widths can be sequentially decreased from the first sub-electrode 121a in the middle to the first sub-electrodes 121a on both sides; and namely, the closer the first sub-electrode 121a is to the middle position, the greater the width of the first sub-electrode 121a is, the farther the first sub-electrode 121a is away from the middle position, the smaller the width of the first sub-electrode 121a is, and in the first sub-electrodes 121a from the middle to one side, the electrode widths are all different. Further optionally, with reference to FIG. 5D, the electrode widths of the first sub-electrodes are decrease progressively in a gradient mode from middle to both sides; and for this implementation mode, in the first sub-electrodes 121a from middle to one side, it is allowed that two adjacent first sub-electrodes 121a or more than two first sub-electrodes 121a are the same in electrode width. For example, with reference to the drawings, the electrode width of the first sub-electrode at the middle position is m1, and in a leftward direction, one first sub-electrode with a width of m2, two first sub-electrodes with a width of m3, two first sub-electrodes with a width of m4 and three first sub-electrodes with a width of m5 are sequentially arranged, wherein m1>m2>m3>m4>m5.

The reason of adopting the electrode arrangement above is that in some cases, for the convex lens (the dotted lines in FIG. 5D) to which the liquid crystal lens needs to be equivalent, a radian of a region in the middle is relatively mild, and radians of regions on both the sides are relatively large. At the moment, the liquid crystals in the regions on both the sides need to be regulated more finely, and thus, distribution densities (numbers in unit area) of the first sub-electrodes on both the sides should be greater than that of the first sub-electrodes in the region in the middle.

Further, for example, in the embodiment, the equivalent convex lens formed by the liquid crystal lens is symmetric, and with reference to FIG. 5B to FIG. 5D, the left side and the right side of the equivalent convex lens formed by the liquid crystal lens are the same.

For the liquid crystal lens illustrated in FIG. 5B to FIG. 5D, voltages between the first electrode 121 and the second electrode 122, for example, are gradually increased from middle to both sides. Exemplarily, a voltage value of the second electrode 122 in FIG. 5D is 0V, voltage values of nine first sub-electrodes from left side to middle in FIG. 5D can sequentially be 9V, 8V, 7V, 6V, 5V, 4V, 3V, 2V and 1V, and voltage values of the first sub-electrodes from right side to middle in FIG. 5D can be the same. Further exemplarily, the voltage value of the second electrode 122 in FIG. 5D is 0V, the voltage values of nine first sub-electrodes from left side to middle in FIG. 5D can sequentially be 8V, 8V, 7V, 6V, 6V, 4V, 3V, 2V and 1V, and the voltage values of the first sub-electrodes from right side to middle in FIG. 5D can be the same.

Figure 5E:
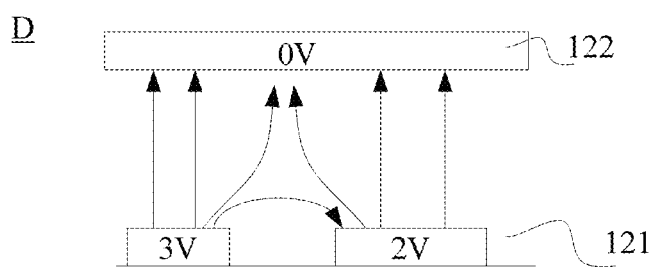
FIG. 5E is a partial enlarged diagram of a D portion in FIG. 5D.

FIG. 5E is an enlarged diagram of a D portion in FIG. 5D, and shows a direction of the electric field formed when the values of the voltages applied to two adjacent first sub-electrodes are different.

Figure 5F:
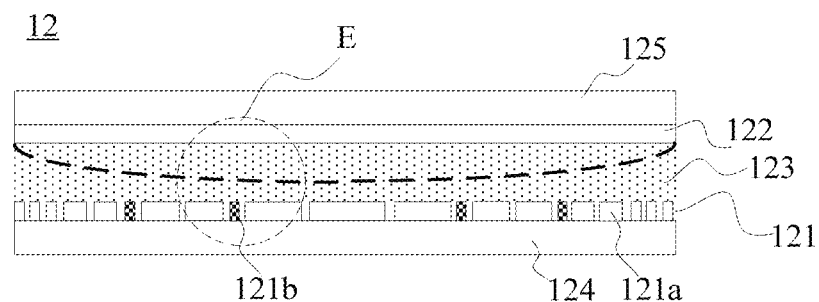
FIG. 5F is a side view of the liquid crystal lens provided by the embodiment of the present disclosure.

For example, in order to avoid generation of a horizontal electric field, in the embodiment of the present disclosure, with reference to FIG. 5F, the first electrode 121 further includes: at least one second sub-electrode 121b, the second sub-electrode 121b extending along the direction of the vertical center line of the display panel. For example, the width of each first sub-electrode 121a is constant. Each second sub-electrode 121b is only adjacent to the first sub-electrode 121a. Namely, a case that two second sub-electrodes 121b are adjacent cannot occur.

Figure 5G:
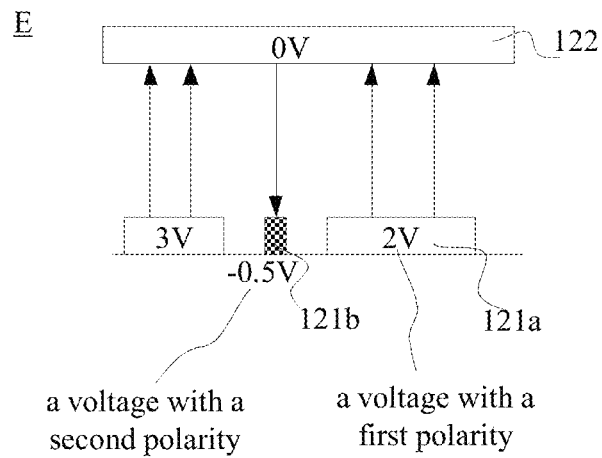
FIG. 5G is a partial enlarged diagram of an E portion in FIG. 5D.

With reference to FIG. 5G, a direction of an electric field which can be formed by the first sub-electrode 121a and the second electrode 122 is opposite to that of an electric field which can be formed by the second sub-electrode 121b and the second electrode 122. By additionally arranging the second sub-electrode for reversely regulating the electric field, interference brought by a transverse electric field can be reduced.

Furthermore, a width of the second sub-electrode 121b is smaller than that of the first sub-electrode 121a adjacent to the second sub-electrode 121b. This is for enabling this reverse electric field not to excessively influence the originally required forward electric field.

Figure 5H:
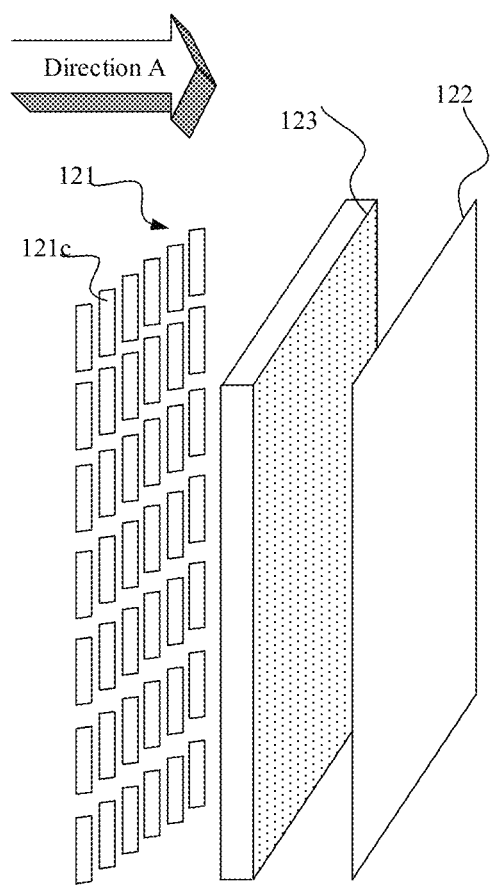
FIG. 5H is a stereoscopic structural schematic diagram of a liquid crystal lens provided by an embodiment of the present disclosure.

With reference to FIG. 5H, the embodiment of the present disclosure further can provide a structure of a liquid crystal lens. The liquid crystal lens includes: a first electrode 121 and a second electrode 122 which are arranged oppositely, wherein the first electrode 121 includes a plurality of first sub-electrodes 121c arranged in an array. The array, for example, at least includes a plurality of first sub-electrode rows and a plurality of first sub-electrode columns. The liquid crystal lens further includes: a liquid crystal layer 123, the liquid crystal layer 123 being arranged between the first electrode 121 and the second electrode 122.

Therefore, an effect taken in common by one column of first sub-electrodes 121c arranged along the direction of the vertical center line of the display panel can be equivalent to that taken by one first sub-electrode 121a in FIG. 5A. Therefore, a voltage size of each column of first sub-electrodes 121c can refer to that of one first sub-electrode 121a, and is not repeated herein.

The first sub-electrodes 121c are arranged in a dot matrix, so that when the display apparatus can rotate by 90 degrees, i.e., an original vertical center line is changed into the transverse center line and an original transverse center line is changed into the vertical center line, the vertical light also can be converged along a new center plane by powering up the first electrode and the second electrode.

The display apparatus provided by the embodiment of the present disclosure includes the display panel and the liquid crystal lens capable of converging the light emitted by the display panel towards the direction of the center plane, so that in the case that the display panel 11 does not need to be bent, the curved surface display effect is basically achieved by additionally arranging the liquid crystal lens. Further, if the light emitted by the display panel is the vertical light, the curved surface display effect is better. The display panel is a flat surface and does not need to be physically bent, and thus, problems of requirement for high bendability of a material and high difficulty to achieve the curved surface display in the process in the relate art can be solved.

Embodiment II

The embodiment of the present disclosure provides a display apparatus. A structure of a display panel is described below, and the display panel can emit vertical light; and a structure of a liquid crystal lens can refer to Embodiment I, and is not repeated in the embodiment.

As mentioned in Embodiment I, there are various types of display panels 11. However, any type of display panel can refer to FIG. 7, and includes: a first substrate 111 and a second substrate 112 which are arranged oppositely and in parallel. A pixel structure (a portion between 112 and 111 in the drawing) capable of implementing display is generally arranged between two substrates. In order to simplify description, the pixel structure is not drawn in detail in the embodiment. Materials of the substrates may be transparent glass and the like. In order to clearly describe the solution, in the embodiment, the second substrate 112 is limited to be closer to the liquid crystal lens 12 with respect to the first substrate 111, and in other words, the substrate close to the liquid crystal lens 12 is referred as the second substrate 12, and the substrate away from the liquid crystal lens 12 is referred as the first substrate 111.

In order to enable the display panel to emit the vertical light, the display panel 11 further includes: a light correction portion 113, the light correction portion 113 being borne by the first substrate 111 or the second substrate 112. It should be noted that when the light correction portion 113 is borne by the first substrate 111, it shows that the light correction portion 113 is made on the first substrate 111, can be positioned on an inner side (a first position in the drawing) of the first substrate 111, and can also be positioned on an outer side (a second position in the drawing) of the first substrate 111. Similarly, if the light correction portion 113 is borne by the second substrate 112, the light correction portion 113 can be positioned on an inner side (a fourth position in the drawing) of the second substrate 112 or on an outer side (a third position in the drawing) of the second substrate 112.

Figure 7:
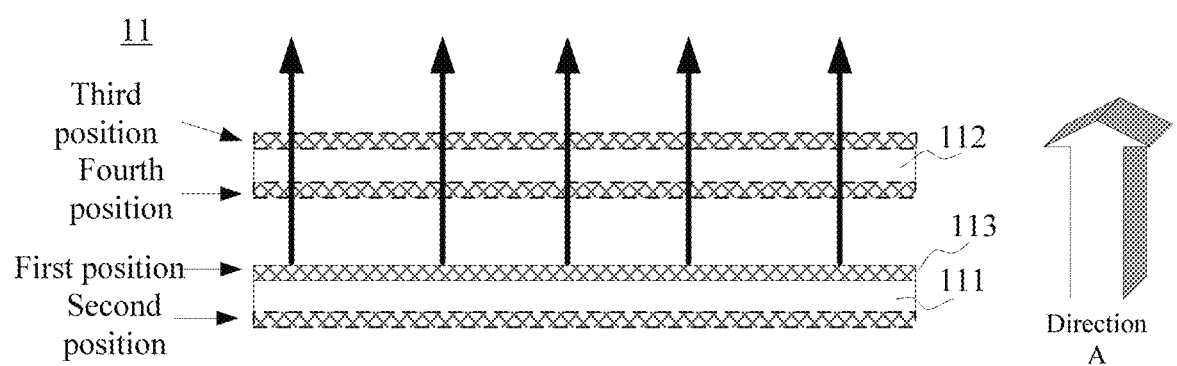
FIG. 7 is a position schematic diagram of a light correction portion in a display apparatus provided by an embodiment of the present disclosure.

In FIG. 7, a case that the light correction portion 113 is arranged at the first position of the display panel is taken as an example, and other positions only represent positions to which the light correction portion 113 at the first position can be moved. In addition, the light correction portion 113 in the drawing is closely attached to a surface of the substrate, but actually, other layers can also be arranged between the light correction portion 113 and the substrate. For example, if the light correction portion 113 is arranged at the third position, an upper polarizer can also be arranged between the second substrate 112 and the light correction portion 113, and certainly, the light correction portion 113 can also be arranged between the upper polarizer and the second substrate 112.

The light correction portion 113 is used for correcting incident light into emergent light perpendicular to a panel surface of the display panel. The incident light herein means light which is incident to the light correction portion 113, and the emergent light means light emerging from the light correction portion 113. If the light correction portion 113 is positioned at the first position in FIG. 7, a transmission direction of the light emerging from the light correction portion 113 can refer to an upward arrow in the drawing. Therefore, the display panel 11 can emit the vertical light. Certainly, due to little influence of the pixel structure on the transmission direction of the light, influence of the pixel structure on the transmission direction of the light can be ignored in the embodiment.

Different types of display panels will be respectively illustrated below.

Passive Display Panel

Firstly, the passive display panel will be illustrated. As is known to all, this display panel cannot emit light by the self and can implement display by light emitted by a backlight module, and thus, the display panel can be referred to as the passive display panel.

In the embodiment, the passive display panel is described in detail by taking a liquid crystal display panel as an example.

Figure 8:
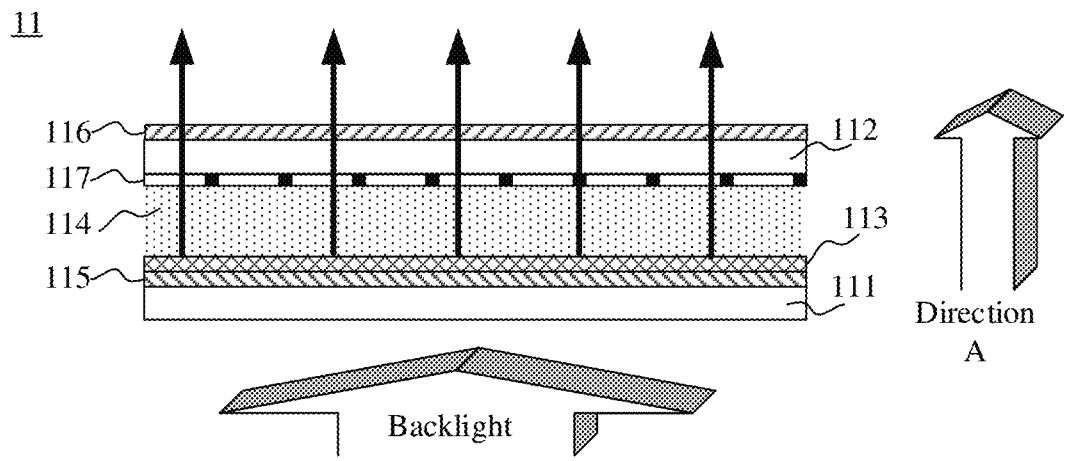
FIG. 8 is a schematic diagram of a liquid crystal display apparatus provided by an embodiment of the present disclosure.
Figure 9:
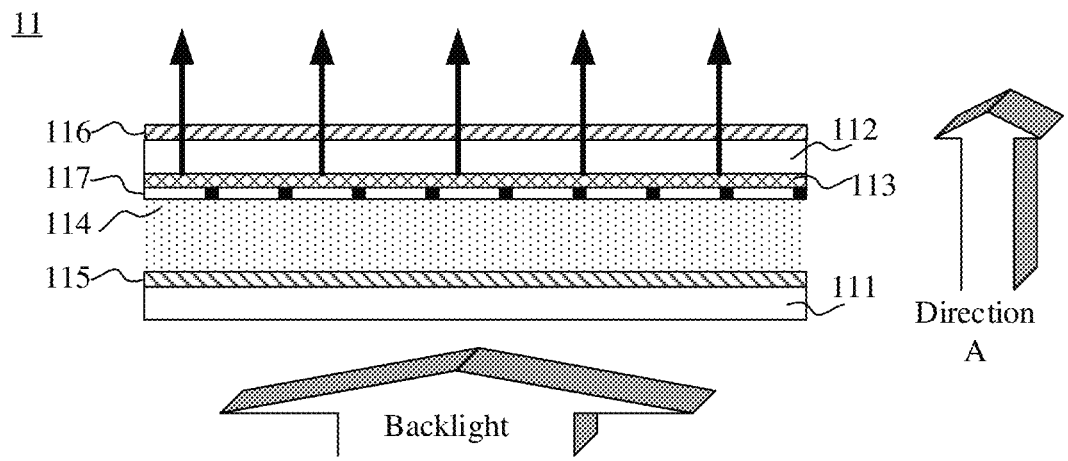
FIG. 9 is a schematic diagram of another liquid crystal display apparatus provided by an embodiment of the present disclosure.

As illustrated in FIG. 8 and FIG. 9, the display panel 11 includes: a first substrate 111, a second substrate 112, and a liquid crystal layer 114 between the first substrate 111 and the second substrate 112. The liquid crystal display panel cannot emit light by the self, and thus, backlight needs to be provided by a backlight module. For example, light emitted by the backlight module is not vertical light, and thus, the display panel 11 in the embodiment needs to correct the backlight emitted by the backlight module into the vertical light.

Furthermore, the display panel 11 further includes: a wire grid polarizer (WGP) 115 arranged on the first substrate 111. The case that the WGP is arranged on the first substrate 111 denotes that the WGP 115 is borne by the first substrate 111, and particularly, the WGP 115 can be arranged on an outer side of the first substrate 111, and can also be arranged on an inner side of the first substrate 111. The WGP 115 can be made by adopting a nanoimprint technology.

For most of liquid crystal display panels, a lower polarizer needs to be arranged on the outer side of the first substrate, and an upper polarizer needs to be arranged on an outer side of the second substrate, and thus, corresponding layer or component structures need to be arranged on both sides of the substrates and the substrates need to be overturned in the technical process so as to cause a complex process. In the embodiment, for example, as illustrated in FIG. 8 and FIG. 9, the display panel 11 further includes: a WGP 115 arranged on the inner side of the first substrate 111. The WGP 115 can replace the original lower polarizer, and at the moment, the upper polarizer 116 can be arranged on the outer side of the second substrate 112.

It should be noted that the WGP can be positioned between the first substrate 111 and the liquid crystal layer 114. For example, the WGP can be arranged on an inner side surface (which also can be referred to as an upper surface) of the first substrate 111 and be in contact with the inner side surface of the first substrate 111.

First Possible Implementation Mode

The display panel 11 is a common liquid crystal display panel, and namely includes an array substrate and a color filter substrate. The first substrate 111 can be used as a substrate of the array substrate, and the second substrate 112 is used as a substrate of the color filter substrate; and certainly, the first substrate 111 also can be used as the substrate of the color filter substrate, and the second substrate 112 is used as the substrate of the array substrate. In the embodiment, by taking the previous case as an example, at the moment, pixel electrodes arranged in an array, a signal line for applying a voltage to the pixel electrodes, a switching unit and the like are arranged on the first substrate 111, and further, the first substrate 111 further possibly includes a common electrode and the like (these component and layer structures are not illustrated in the drawings, and can refer to the related art); and a color filter layer, a black matrix and the like (these layers are not illustrated in the drawings, and can refer to the related art) are arranged on the second substrate 112.

In order to correct light, the display panel 11 in the embodiment further includes a light correction portion 113. For example, the light correction portion 113 is arranged between the first substrate 111 and the second substrate 112, i.e., the light correction portion 113 is of an in cell structure.

As illustrated in FIG. 8, the light correction portion 113 is made on the inner side of the first substrate. For example, the light correction portion 113 can be arranged on a Thin Film Transistor (TFT) structure on the inner side of the first substrate 111, i.e., on the first substrate 111, the TFT structure is firstly made and then the light correction portion 113 is made; and the light correction portion 113 also can be arranged between the first substrate 111 and the TFT structure, i.e., the light correction portion 113 is firstly made on the first substrate 111, and then the TFT structure is made on the light correction portion 113.

As illustrated in FIG. 9, the light correction portion 113 also can be made on the inner side of the second substrate 112. At the moment, the light correction portion 113 can be made on a color filter, i.e., the color filter is firstly made on the second substrate 112, and then the light correction portion (not illustrated in the drawing) is made on the color filter; and the light correction portion 113 also can be arranged between the second substrate 112 and the color filter 117, i.e., the light correction portion 113 is firstly made on the second substrate 112, and then the color filter 117 is made on the light correction portion 113.

In the embodiment of the present disclosure, a size of the light correction portion 113 can be the same with that of the display panel, and at least is the same with that of a display region (i.e., a region where light emerges for display) in the display panel.

Figure 10:
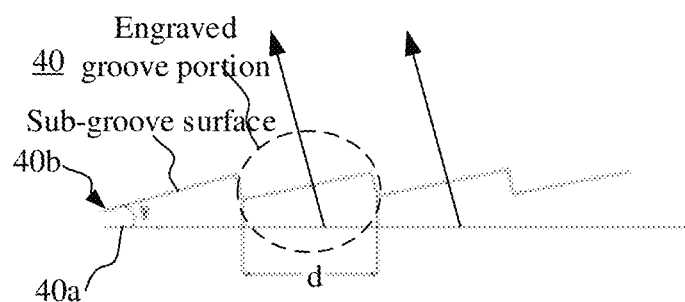
FIG. 10 is a schematic diagram of a diffraction grating provided by an embodiment of the present disclosure.

A structure of the light correction portion 113 will be described in detail in the following. In the embodiment, the light correction portion 113 can include a diffraction microstructure. The diffraction microstructure can be a diffraction grating 40 as illustrated in FIG. 10.

The diffraction grating 40 is made of a transparent material, is a transmissive diffraction grating, has a grating surface 40a and a groove surface 40b, and for example, may be a blazing grating, wherein the groove surface 40b is of a sawtooth shape, and an angle between the sawtooth-shaped groove surface 40b and the grating surface 40a is referred as a blazing angle and is denoted as γ. Generally, the blazing angle is an acute angle. It can be seen from the drawing that the diffraction grating 40 includes a plurality of engraved groove portions, and a width corresponding to each engraved groove portion is referred to as an engraving period and is denoted as d; d and γ of each engraved portion can be the same or can be different. In order to facilitate description, on the groove surface 40b, an adjacent surface (adopting the meaning of an adjacent side) of the blazing angle γ in two surfaces constituting one engraved portion is referred as a sub-groove surface.

A light correction principle of the diffraction grating 40 is that: incident light is extracted out on the basis of diffraction of light, and if an incident direction and a wavelength of light which is incident to the diffraction grating 40 meet a certain condition, a beam with the wavelength can be subjected to blazing reinforced emergence at a specific angle. Exemplarily, if the light which is incident to the groove surface 40b is perpendicular to the groove surface 40b and meets $2d*\sin\gamma=\lambda$, a beam with a wavelength λ may be subjected to blazing reinforced emergence at a specific angle (the sub-groove surface perpendicular to the groove surface 40b). Therefore, by setting γ and d of each engraved portion, the light which is incident to the diffraction grating 40 can be converted into parallel light which has a preset wavelength and emerges at a preset angle. Other incident light emerges in a non-reinforced mode, i.e., is relatively weak in energy, and this part of light is not considered in the embodiment.

On this basis, by designing different d and γ, different light emergent angles and different light emergent wavebands can be obtained. Particularly, in the embodiment, the diffraction grating 40 has a selecting effect on the incident light, and can select out parallel beams perpendicular to the sub-groove surface for emergence.

For example, if each engraved portion is the same in γ and at the moment, each sub-groove surface is in parallel, the diffraction grating 40 can select out a plurality of groups of parallel beams, each group of parallel beams are perpendicular to the sub-groove surface, and in other words, when each sub-groove surface is in parallel, emergent light emerging from the diffraction grating 40 is parallel light perpendicular to the integral groove surface 40b. At the moment, d of different engraved portions can be set to make the light emergent wavebands different.

By means of the principle above, the embodiment provides the light correction portion 113 below.

Figure 11:
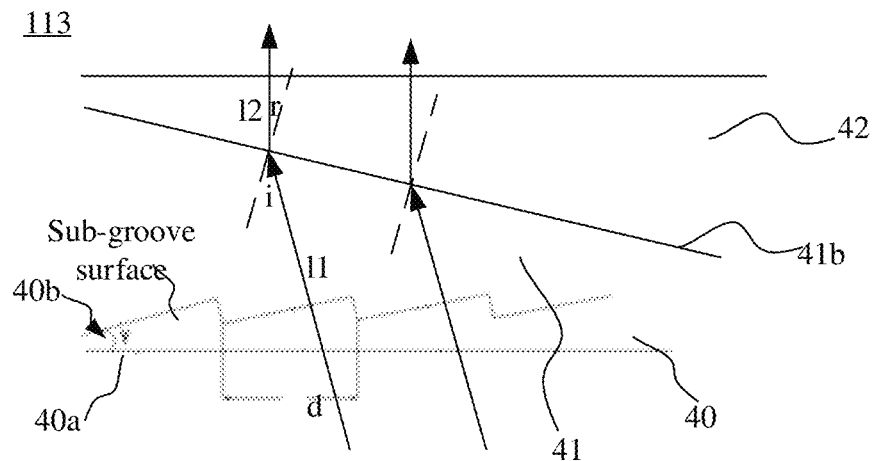
FIG. 11 is a schematic diagram of a light correction portion provided by an embodiment of the present disclosure.

The light correction portion 113 provided by the embodiment can refer to FIG. 11, and includes: the diffraction grating 40 and a first dielectric layer 41.

The diffraction grating 40 has the grating surface 40a and the groove surface 40b, the groove surface 40b includes a plurality of sub-groove surfaces, and each sub-groove surface is slantingly arranged (the slanting arrangement means that each sub-groove surface is neither parallel to a panel surface of the display panel, nor perpendicular to the panel surface of the display panel), wherein the grating surface 40a is a light incident surface, and the groove surface 40b is a light emergent surface. In order to facilitate arrangement, in the embodiment, optionally, the grating surface 40a is in parallel to the panel surface of the display panel, and then the sub-groove surface is slanting necessarily; and by combining the working principle of the diffraction grating, light emerging from the groove surface 40b can be perpendicular to each sub-groove surface, and then the light emerging from the groove surface 40b cannot be perpendicular to the panel surface of the display panel, and thus, correction needs to be carried out for once again by the first dielectric layer 41.

It should be noted that in order to enable the light emerging from the groove surface 40b to be parallel light, for example, each sub-groove surface of the groove surface 40b is arranged in parallel.

The first dielectric layer 41 is positioned on the groove surface 40b of the diffraction grating 40, and light emerging from the diffraction grating 40 is refracted by a light emergent surface 41b of the first dielectric layer and becomes emergent light perpendicular to the panel surface of the display panel. According to the preferred solution above, the light emerging from the diffraction grating 40 is the parallel light perpendicular to the groove surface 40b, so that design of the light emergent surface 41b of the first dielectric layer can be simplified.

Figure 12:
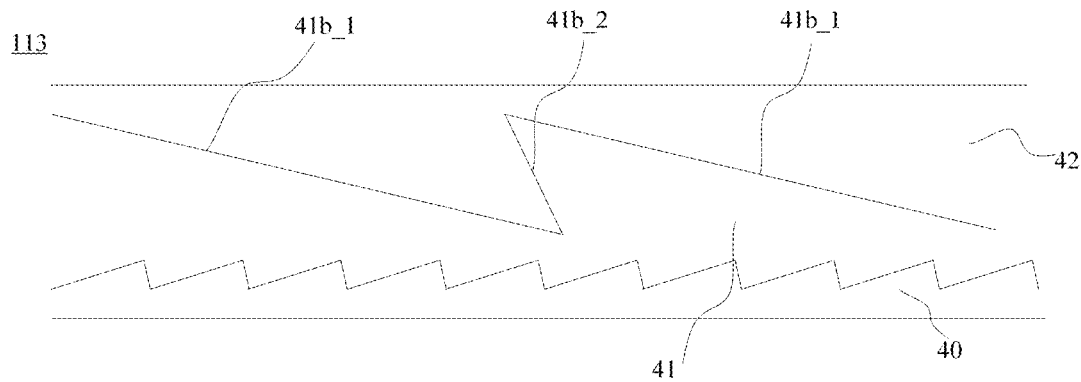
FIG. 12 is a schematic diagram of a light correction portion provided by an embodiment of the present disclosure.

It should be noted that as illustrated in FIG. 11, the light emergent surface 41b of the first dielectric layer may be an inclined plane, and for example, the inclined plane is flat. However, in this case, a thickness of a left end of the first dielectric layer 41 can still be relatively large. Therefore, in the embodiment, for example, as illustrated in FIG. 12, the light emergent surface 41b of the first dielectric layer includes a plurality of parallel refraction sub surfaces 41b_1, and as illustrated in the drawing, each refraction sub surface is a flat inclined plane. The light emergent surface 41b further includes connecting sub surfaces 41b_2 for connecting these refraction sub surfaces 41b 1, wherein the refraction sub surfaces 41b 1 are used for refracting the light emerging from the diffraction grating 40 into the light perpendicular to the panel surface of the display panel; and besides taking a connecting effect, in order to avoid interference to the light, the connecting sub surfaces 41b 2 for example can be perpendicular to the sub-groove surfaces of the diffraction grating 40.

The light is refracted on an interface of the first dielectric layer 41 and other transparent media (denoted as a medium W). For the interface, the transmission direction of the incident light 11 is known, and a transmission direction of refracted light 12 needs to meet a requirement that the transmission direction of the refracted light 12 is perpendicular to the panel surface of the display panel, and thus, the transmission direction of the refracted light 12 is also known. Secondly, after a transparent material of the first dielectric layer 41 is selected, a refractive index n1 of the first dielectric layer 41 is known. In addition, if a position of the light correction portion 113 is designed well, a refractive index n2 of the medium W can also be known; for example, if the light correction portion 113 only includes two portions of the diffraction grating 40 and the first dielectric layer 41 and the first dielectric layer 41 is directly in contact with the liquid crystal layer, n2 is a refractive index of the liquid crystal layer; and further for example, if the light correction portion 113 only includes two portions of the diffraction grating 40 and the first dielectric layer 41 and the light correction portion 113 is positioned on an outer side of the upper polarizer of the display panel, n2 is a refractive index of air. Based on the known parameters above, by combining a commonly-known refraction law, the interface (i.e., the light emergent surface 41b of the first dielectric layer) which meets the requirement can be designed, and for example, an inclination direction and an inclination angle of the light emergent surface 41b of the first dielectric layer can be obtained.

For example, as illustrated in FIG. 11, in the embodiment, the sub-groove surface of the groove surface 40b is opposite to the light emergent surface 41b of the first dielectric layer in inclination direction. For example, the sub-groove surface has an inclination direction of which a left portion is low and a right portion is high, and the light emergent surface 41b of the first dielectric layer has an inclination direction of which a left portion is high and a right portion is low, which are beneficial to lighting and thinning of the light correction portion 113. According to an optical path diagram and the refraction law $n1*\sin i = n2*\sin r$, in this case, if i is greater than r, and thus, n1 needs to be smaller than n2, and in other words, the refractive index of the medium W needs to be greater than that of the first dielectric layer 41.

Furthermore, for example, as illustrated in FIG. 11 and FIG. 12, the light correction portion 113 also includes: a second dielectric layer 42, the second dielectric layer 42 being positioned on the light emergent surface of the first dielectric layer 41, and a light emergent surface of the second dielectric layer 42 being in parallel to the panel surface of the display panel. Light refracted from the light emergent surface of the first dielectric layer 41 has been perpendicular to the panel surface of the display panel, and thus, the light is not refracted when passing through the emergent surface of the second dielectric layer 42, so that the emergent light of the light correction portion 113 is perpendicular to the panel surface of the display panel.

Figure 13:
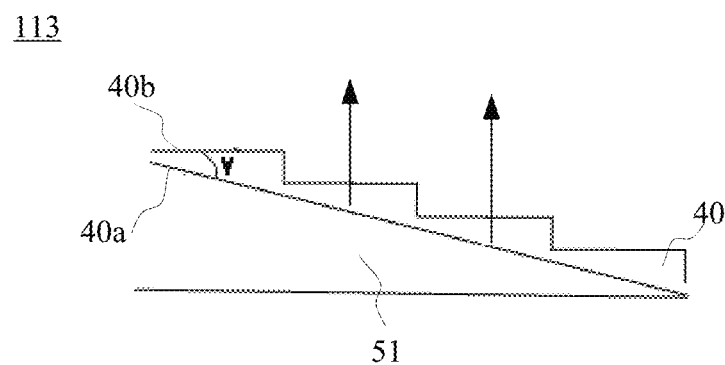
FIG. 13 is a schematic diagram of a light correction portion provided by an embodiment of the present disclosure.

With reference to FIG. 13, the embodiment further provides another light correction portion 113, including: a diffraction grating 40, the diffraction grating 40 having a grating surface 40a and a groove surface 40b, the groove surface 40b including a plurality of sub-groove surfaces, and the sub-groove surfaces being in parallel to the panel surface of the display panel, wherein the grating surface 40a is a light incident surface, and the groove surface 40b is a light emergent surface. Based on a principle of the diffraction grating, the emergent light emerging from the diffraction grating can have a specific wavelength and be perpendicular to the panel surface of the display panel.

If the light correction portion 113 only includes the diffraction grating, due to an inclined state of the grating surface 40a of the diffraction grating 40 at the moment, at the moment, the diffraction grating is difficult to stably arrange in the display panel. Therefore, for example, the light correction portion 113 further includes: a first dielectric layer 51, the diffraction grating 40 being positioned on the first dielectric layer 51, and the grating surface 40a of the diffraction grating being attached to the first dielectric layer 51. Therefore, the first dielectric layer 51 takes an effect of supporting the diffraction grating.

Figure 14:
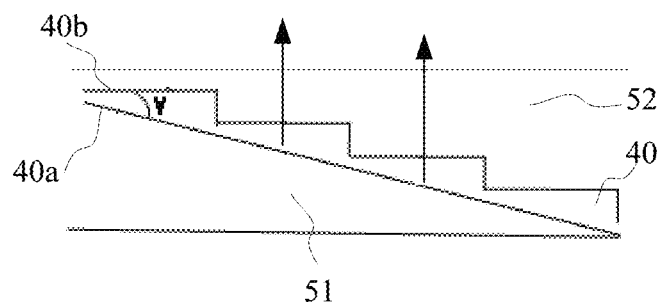
FIG. 14 is a schematic diagram of a light correction portion provided by an embodiment of the present disclosure.

Optionally, if the groove surface 40b of the diffraction grating 40 needs to be further protected, with reference to FIG. 14, the light correction portion 113 can further include: a second dielectric layer 52, the second dielectric layer being positioned on the groove surface 40b of the diffraction grating, and a light emergent surface of the second dielectric layer 52 being in parallel to the panel surface of the display panel. Therefore, the additionally arranged second dielectric layer 52 cannot change a transmission direction of the original vertical light.

Figure 15:
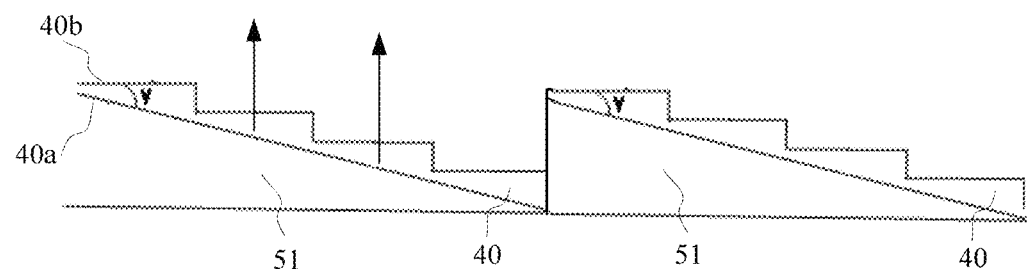
FIG. 15 is a schematic diagram of a light correction portion provided by an embodiment of the present disclosure.

Further, in consideration of an integral thickness of the light correction portion 113, with reference to FIG. 15, a plurality of diffraction gratings 40 and a plurality of first dielectric layers 51 can be included, and each dielectric layer 51 and the diffraction grating 40 positioned thereon are arranged periodically along a direction in parallel to the panel surface of the display panel. Therefore, a small thickness of the light correction portion 113 can be obtained.

The above mainly describes the transmission direction of the light, and in the following, due to consideration to a case that the diffraction grating can generate a blazing reinforced emerging effect on the beam with the specific wavelength, in the embodiment, in consideration of color characteristics of a color display panel, the diffraction grating adaptive to the color characteristics can be designed.

Figure 16:
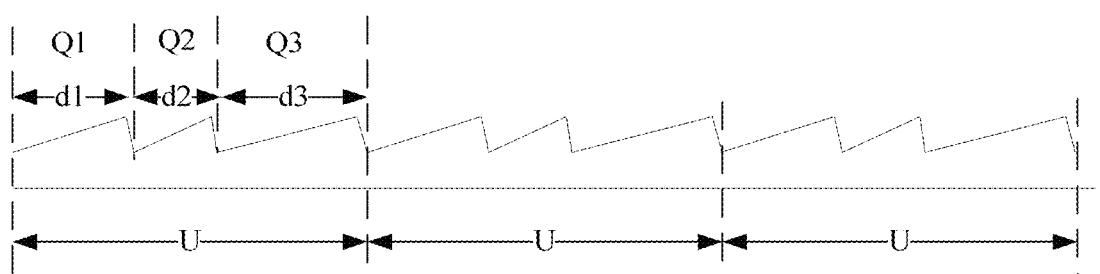
FIG. 16 is a schematic diagram of a diffraction grating provided by an embodiment of the present disclosure.
Figure 17:
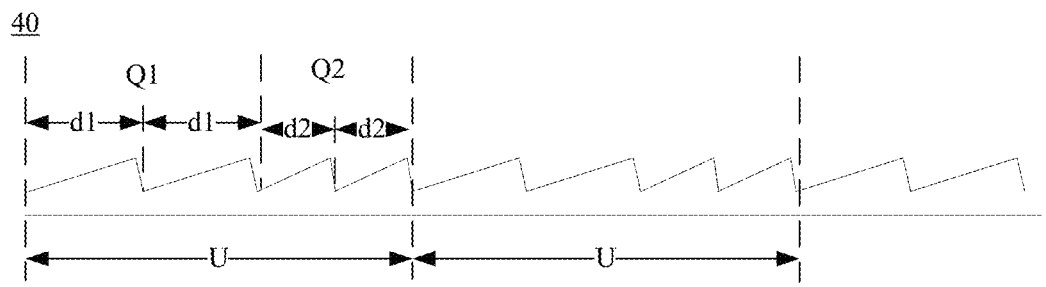
FIG. 17 is a schematic diagram of a diffraction grating provided by an embodiment of the present disclosure.

For example, with reference to FIG. 16 and FIG. 17, the diffraction grating 40 includes engraved groove portions arranged periodically, the engraved groove portions in each period U include: engraved groove groups arranged sequentially, each engraved groove group includes the same number of engraved groove portions, the engraved groove portions in the same engraved groove group are the same in shape, and the engraved groove portions in different engraved groove groups are different in shape.

Exemplarily, as illustrated in FIG. 16, the engraved groove portions in each period U include three engraved groove groups Q1, Q2 and Q3 arranged sequentially, each engraved groove group includes one engraved groove portion, and the engraved groove portions in different engraved groove groups are different in shape. The shape of the engraved groove portion is determined by d and γ of the engraved groove portion, and in the embodiment, for example, all the engraved groove portions are the same in γ, i.e., all the sub-groove surfaces are in parallel. Particularly in this example, an engraved groove width of the engraved groove portion in the engraved groove group Q1 is d1, an engraved groove width of the engraved groove portion in the engraved groove group Q2 is d2, an engraved groove width of the engraved groove portion in the engraved groove group Q3 is d3, and d1, d2 and d3 are all different. It can be known from the working principle of the diffraction grating that wavelengths capable of being subjected to blazing reinforced emergence by the three sub-groove surfaces are different. Exemplarily, by regulating the engraved groove widths, the three sub-groove surfaces can respectively carry out blazing emergence of wavebands (e.g., wavebands of red, green and blue) of three primary colors of light. The light correction portion 113 including such diffraction grating 40 can be arranged in a light emergent direction of the color filter, and for example, with reference to FIG. 9, can be arranged between the color filter 117 and the second substrate 112.

Further exemplarily, as illustrated in FIG. 17, the engraved groove portions in each period U include two engraved groove groups Q1 and Q2 arranged sequentially, the engraved groove group Q1 includes two engraved groove portions which are of the same shape, and the engraved groove group Q2 includes two engraved groove portions which are of the same shape, wherein the engraved groove portions in the engraved groove group Q1 and the engraved groove portions in the engraved groove group Q2 are different in shape. Particularly in this example, an engraved groove width of the engraved groove portion in the engraved groove group Q1 is d1, an engraved groove width of the engraved groove portion in the engraved groove group Q2 is d2, and d1 and d2 are all different. It can be known from the working principle of the diffraction grating that wavelengths capable of being subjected to blazing reinforced emergence by the two sub-groove surfaces are different. Exemplarily, by regulating the engraved groove widths, the two sub-groove surfaces can respectively carry out blazing emergence of wavebands (e.g., wavebands of blue light and yellow light) of two colors of light. The light correction portion 113 including such diffraction grating 40 can be arranged at a position of light before the light passes through the color filter, and with reference to FIG. 8, can be arranged on the first substrate 111. White light emitted by a common backlight module is mixed light of the blue light and the yellow light, and the blue light and the yellow light can be respectively subjected to blazing emergence by such diffraction grating 40 so as not to excessively influence display characteristics of the display panel.

Second Possible Implementation Mode

In addition, the first substrate 111 further can be used as a substrate of a Color-Filter On Array (COA) substrate, and the second substrate 112 is used as a substrate of a package substrate; and of course, the first substrate 111 also can be used as the substrate of the package substrate, and the second substrate 112 is used as the substrate of the COA substrate.

In such liquid crystal display panel, the light correction portion 113 can also be additionally arranged, and the structure and the shape of the light correction portion 113 can refer to descriptions on the common liquid crystal display panel in the first implementation mode and are not repeated herein.

Self-Illumination Display Panel

The self-illumination display panel in the embodiment is described in detail by taking an Organic Light-Emitting Diode (OLED) display panel as an example.

Figure 18:
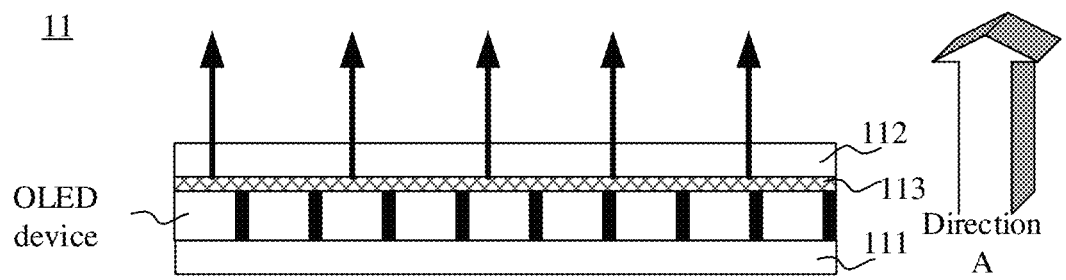
FIG. 18 is a schematic diagram of an active display apparatus provided by an embodiment of the present disclosure.

As illustrated in FIG. 18, the display panel 11 (the OLED display panel) includes: a first substrate 111, a second substrate 112, and a plurality of OLED devices between the first substrate 111 and the second substrate 112, each OLED device being used as a smallest display unit (which can be referred to as a pixel or a sub pixel) in the display panel.

For such OLED display panel, if the OLED display panel is expected to emit vertical light, a light correction portion 113 can be additionally arranged in the OLED display panel. The OLED devices in the OLED display panels are light-emitting components, and thus, the light correction portion 113 should be arranged on a light emergent side of the OLED devices, so that light emitted by the OLED devices can be corrected into the vertical light by the light correction portion 113. For example, the light correction portion 113 is arranged between the OLED devices and the second substrate 112, i.e., an in-cell mode is adopted, so that the light correction portion can be protected. Further for example, the light correction portion 113 is positioned on an inner side surface (a lower surface in the drawing) of the second substrate 112, and is in contact with the inner side surface of the second substrate 112.

The structure and the shape of the light correction portion 113 can still refer to descriptions on the common liquid crystal display panel in the first implementation mode, and are not repeated herein.

Embodiment III

As mentioned in Embodiment II, the passive display panel cannot emit light by the self, and needs to implement display by the light emitted by the backlight module. In Embodiment II, the light correction portion is additionally arranged in the existing passive display panel so as to correct the light which is incident to the passive display panel into the vertical light and enable the vertical light to emerge from the passive display panel.

In this embodiment, a new idea is provided for a problem how to enable the vertical light to emerge from the passive display panel. Namely, without changing the structure of the original passive display panel, the light correction portion is additionally arranged in the original backlight module to enable the backlight module to emit the vertical light, and at the moment, influence of the passive display panel on the transmission direction of the light is ignored, so that the vertical light emerges from the passive display panel.

Figure 19:
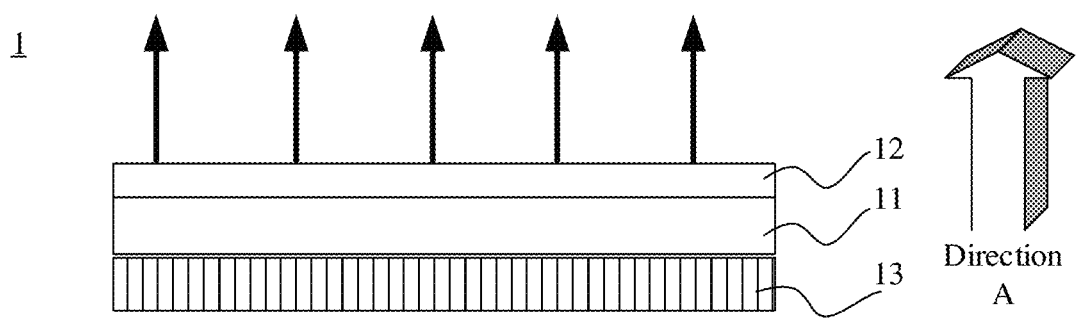
FIG. 19 is a schematic diagram of another display apparatus provided by an embodiment of the present disclosure.

With reference to FIG. 19, the embodiment provides a display apparatus, including: a display panel 11, a liquid crystal lens 12 and a backlight module 13.

The display panel 11 is the passive display panel, and exemplarily, can be a liquid crystal display panel. The display panel may be a display panel in the related art, and of course, can also be the display panel mentioned in Embodiment II, so that the display panel can take a secondary correction effect.

The liquid crystal lens 12 can refer to descriptions in Embodiment I, and is not repeated herein.

The backlight module 13 includes: a light source, and a light correction portion positioned in a light emergent direction of the light source, the light correction portion being used for correcting incident light into emergent light perpendicular to a panel surface of the display panel. The light correction portion can refer to descriptions in Embodiment II, and is not repeated herein.

The backlight module 13 may be a direct-lit backlight module, and the direct-lit backlight module includes a light source, a diffusion plate and an optical sheet group positioned in a light emergent direction of the diffusion plate. In the embodiment, the light correction portion may be arranged between the diffusion plate and the optical sheet group, and may also be arranged in a light emergent direction of the optical sheet group.

Figure 20:
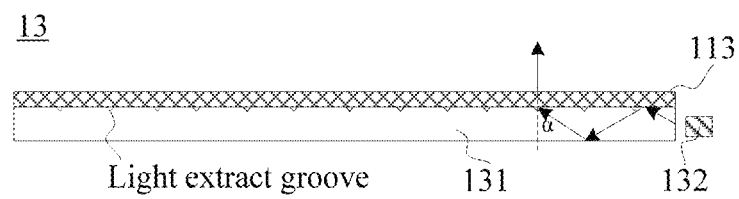
FIG. 20 is a structural schematic diagram of a backlight module in the display apparatus illustrated in FIG. 19.

For example, as illustrated in FIG. 20, the backlight module 13 may also be a edge-lit backlight module, and the edge-lit backlight module further includes: a light guide plate 131, the light source 132 being positioned on a side surface of the light guide plate 131, and the light correction portion 113 being positioned in a light emergent direction of the light guide plate 131.

Exemplarily, the light source 132 may be a single-color light source and for example, may be a blue chip, and at the moment, blue light can enter the light guide plate 131. In this case, all engraved groove portions of a diffraction grating in the light correction portion 113 are the same in shape and are used for a blue-light waveband to emerge, and of course, preferably, the blue light emerges perpendicularly to a groove surface of the diffraction grating.

Further, a surface of the light guide plate 131, which faces the light correction portion 113, has a light extract groove. When meeting total reflection conditions, the light emitted by the light source 132 can be totally reflected in the light guide plate 131. Moreover, in the light totally reflected, light with a specific incident angle α can emerge from the light extract groove and enter the light correction portion 113. The specific incident angle α is set according to actual demands, and for example, the angle can be calculated according to an optical theory by guaranteeing the light to be perpendicularly incident to a sub-groove surface of the diffraction grating. Therefore, selection can be carried out for once before the light enters the light correction portion 113, and verticality of the light when the light emerges from the light correction portion 113 can be further ensured.

Certainly, the edge-lit backlight module may further include: an optical sheet group (not illustrated in the drawing) and the like positioned in the light emergent direction of the light guide plate 131. In the embodiment, the light correction portion 113 can be arranged between the light guide plate and the optical diaphragm set, and can also be arranged in a light emergent direction of the optical sheet group.

In addition, such structure combining the light guide plate 131 and the light correction portion 113 may also be arranged inside the display panel, and at the moment, the light source needs to be arranged on a side surface of the light guide plate 131.

According to the display apparatus provided by the embodiments of the present disclosure, by additionally arranging the light correction portion in the backlight module, the backlight module can emit the vertical light, and the vertical light is still the vertical light after passing through the display panel, so that the curved surface display effect is achieved by the liquid crystal lens.

It should be noted that the display apparatus provided by each embodiment of the present disclosure may be any product with a display function, e.g., a television, a notebook computer, a digital photo frame, a mobile phone, a tablet personal computer, a navigator and the like, and may also be a part with the display function, e.g., a display and the like.

Finally, it should be illustrated that the foregoing embodiments merely are used for illustrating technical solutions of the present disclosure, but not intended to limit the present disclosure; although the present disclosure is illustrated in detail with reference to the foregoing embodiments, those skilled in the art should understand that those skilled in the art can still make modifications to the technical solution recorded in each foregoing embodiment, or make equivalent replacements to part of technical features therein; and those modifications or replacements cannot enable essence of the corresponding technical solutions to depart from the spirit and scope of the technical solution in each embodiment of the present disclosure.

The foregoing embodiments merely are exemplary embodiments of the disclosure, and not intended to define the scope of the disclosure, and the scope of the disclosure is determined by the appended claims.

The present application claims priority of the Chinese Patent Application No. 201610222092.7 filed on Apr. 11, 2016, the disclosure of which are incorporated herein by its reference in its entirety as part of the present application.

The invention claimed is:

1. A display apparatus, comprising:
   a flat display panel; and
   a liquid crystal lens, the liquid crystal lens being positioned in a light emergent direction of the display panel, the liquid crystal lens being configured to converge light emitted by the display panel towards a direction of a center plane, and the center plane being perpendicular to the display panel and passing through a vertical center line of the display panel,
   wherein the liquid crystal lens includes:
   a first electrode and a second electrode which are arranged oppositely, wherein the first electrode includes a plurality of strip first sub-electrodes arranged in parallel, and each first sub-electrode extends along a direction of the vertical center line of the display panel; and
   a liquid crystal layer, the liquid crystal layer being arranged between the first electrode and the second electrode;
   wherein the plurality of first sub-electrodes include a middle first sub-electrode positioned at a middle position, and widths of the first sub-electrodes on a same side of the middle first sub-electrode are gradually reduced in a direction away from the middle first sub-electrode.

2. The display apparatus according to claim 1, wherein the second electrode is a plate electrode.

3. The display apparatus according to claim 1, wherein the liquid crystal lens includes: a first electrode and a second electrode which are arranged oppositely, wherein the first electrode includes a plurality of first sub-electrodes arranged in an array;
   a liquid crystal layer, the liquid crystal layer being arranged between the first electrode and the second electrode.

4. The display apparatus according to claim 1, wherein the display panel includes:
   a first substrate and a second substrate which are arranged oppositely and in parallel, wherein the second substrate is closer to the liquid crystal lens with respect to the first substrate; and
   a light correction portion, the light correction portion being borne by the first substrate or the second substrate, and the light correction portion being configured to correct incident light into emergent light perpendicular to a panel surface of the display panel.

5. The display apparatus according to claim 4, wherein the light correction portion includes:
   a diffraction grating, the diffraction grating having a grating surface and a groove surface, the groove surface including a plurality of sub-groove surfaces, and each sub-groove surface being slantingly arranged with respect to the flat display panel, wherein the grating surface is a light incident surface, and the groove surface is a light emergent surface; and
   a first dielectric layer, the first dielectric layer being positioned on the groove surface of the diffraction grating, and light emerging from the diffraction grating being refracted by a light emergent surface of the first dielectric layer and becoming emergent light perpendicular to the panel surface of the display panel.

6. The display apparatus according to claim 5, wherein the light correction portion further includes: a second dielectric layer, the second dielectric layer being positioned on the light emergent surface of the first dielectric layer, and a light emergent surface of the second dielectric layer being in parallel to the panel surface of the display panel.

7. The display apparatus according to claim 4, wherein the light correction portion includes:
   a diffraction grating, the diffraction grating having a grating surface and a groove surface, the groove surface including a plurality of sub-groove surfaces, and the sub-groove surfaces being in parallel to the panel surface of the display panel, wherein the grating surface is a light incident surface, and the groove surface is a light emergent surface.

8. The display apparatus according to claim 1, wherein the display panel is a passive display panel, and the display apparatus further includes: a backlight module; and
   the backlight module includes: a light source and a light correction portion positioned in a light emergent direction of the light source, the light correction portion being used for correcting incident light into emergent light perpendicular to a panel surface of the display panel.

9. The display apparatus according to claim 8, wherein the backlight module further includes: a light guide plate, the light source being positioned on a side surface of the light guide plate, the light correction portion being positioned in the light emergent direction of the light guide plate, and a surface of the light guide plate, which faces the light correction portion, has a light extraction groove; and a part of light emitted by the light source is totally reflected in the light guide plate, and another part of the light emerges from the light extraction groove and enters the light correction portion.

10. The display apparatus according to claim 9, wherein the diffraction grating includes a plurality of engraved groove portions, the engraved groove portions are arranged in different periods, the engraved groove portions in each period are arranged into a plurality of engraved groove groups, each engraved groove group includes a same number of engraved groove portions, the engraved groove portions in a same engraved groove group are the same in shape, and the engraved groove portions in different engraved groove groups are different in shape.

11. The display apparatus according to claim 1, wherein the first electrode further includes: at least one second sub-electrode, the second sub-electrode is arranged between two adjacent first sub-electrodes, and the second sub-electrode extending along the direction of the vertical center line of the display panel, wherein each first sub-electrode is configured to apply a voltage with a first polarity; the second electrode is configured to apply a voltage with a second polarity, and the first polarity is opposite to the second polarity.

12. The display apparatus according to claim 1, wherein the plurality of first sub-electrodes are separated from each other so as to be applied with different voltages respectively.

13. A display apparatus, comprising:
a flat display panel; and
a liquid crystal lens, the liquid crystal lens being positioned in a light emergent direction of the display panel, the liquid crystal lens being configured to converge light emitted by the display panel towards a direction of a center plane, and the center plane being perpendicular to the display panel and passing through a vertical center line of the display panel,
wherein the liquid crystal lens includes:
a first electrode and a second electrode which are arranged oppositely, wherein the first electrode includes a plurality of strip first sub-electrodes arranged in parallel, and each first sub-electrode extends along a direction of the vertical center line of the display panel; and
a liquid crystal layer, the liquid crystal layer being arranged between the first electrode and the second electrode,
wherein the first electrode further includes: at least one second sub-electrode, the second sub-electrode is arranged between two adjacent first sub-electrodes, and the second sub-electrode extending along the direction of the vertical center line of the display panel,
wherein each first sub-electrode is configured to apply a voltage with a first polarity; the second electrode is configured to apply a voltage with a second polarity, and the first polarity is opposite to the second polarity.

14. The display apparatus according to claim 13, wherein the at least one second sub-electrode includes a plurality of second sub-electrodes, and an orthographic projection of the at least one first sub-electrode on a panel surface of the flat display panel is positioned between orthographic projections of any two of the plurality of second sub-electrodes on the panel surface of the flat display panel.

15. The display apparatus according to claim 13, wherein a width of the second sub-electrode is smaller than that of the first sub-electrode adjacent to the second sub-electrode.

16. A display apparatus, comprising:
a flat display panel; and
a liquid crystal lens, the liquid crystal lens being positioned in a light emergent direction of the display panel, the liquid crystal lens being configured to converge light emitted by the display panel towards a direction of a center plane, and the center plane being perpendicular to the display panel and passing through a vertical center line of the display panel;
wherein the display panel includes:
a first substrate and a second substrate which are arranged oppositely and in parallel, wherein the second substrate is closer to the liquid crystal lens with respect to the first substrate; and
a light correction portion, the light correction portion being borne by the first substrate or the second substrate, and the light correction portion being configured to correct incident light into emergent light perpendicular to a panel surface of the display panel;
wherein the light correction portion includes:
a diffraction grating, the diffraction grating having a grating surface and a groove surface, the groove surface including a plurality of sub-groove surfaces, and each sub-groove surface being slantingly arranged with respect to the flat display panel, wherein the grating surface is a light incident surface, and the groove surface opposite to the grating surface is a light emergent surface.

17. The display apparatus according to claim 16, wherein the light correction portion further includes:
a first dielectric layer, the first dielectric layer being positioned on the groove surface of the diffraction grating, and light emerging from the diffraction grating being refracted by a light emergent surface of the first dielectric layer and becoming emergent light perpendicular to the panel surface of the display panel.

18. The display apparatus according to claim 17, wherein the light correction portion further includes: a second dielectric layer, the second dielectric layer being positioned on the light emergent surface of the first dielectric layer, and a light emergent surface of the second dielectric layer being in parallel to the panel surface of the display panel.

19. The display apparatus according to claim 17, wherein a surface of the first dielectric layer away from the diffraction grating is not parallel to the grating surface.

20. The display apparatus according to claim 16, wherein the liquid crystal lens includes:
a first electrode and a second electrode which are arranged oppositely, wherein the first electrode includes a plurality of strip first sub-electrodes arranged in parallel, and each first sub-electrode extends along a direction of the vertical center line of the display panel; and
a liquid crystal layer, the liquid crystal layer being arranged between the first electrode and the second electrode;
wherein the plurality of first sub-electrodes include a middle first sub-electrode positioned at a middle position, and widths of the first sub-electrodes on a same side of the middle first sub-electrode are gradually reduced in a direction away from the middle first sub-electrode.

* * * * *